W. DROSS.
LATHE.
APPLICATION FILED NOV. 27, 1918. RENEWED MAR. 16, 1922.

1,433,605.

Patented Oct. 31, 1922.
2 SHEETS—SHEET 2.

Inventor
W. Dross
By H. M. Wilson
Attorney

Patented Oct. 31, 1922.

1,433,605

UNITED STATES PATENT OFFICE.

WILLIAM DROSS, OF NEWARK, NEW JERSEY, ASSIGNOR OF THIRTY ONE-HUNDREDTHS TO G. M. RICHARDSON, OF HARRIETSTOWN, NEW YORK.

LATHE.

Application filed November 27, 1918, Serial No. 264,352. Renewed March 16, 1922. Serial No. 544,399.

*To all whom it may concern:*

Be it known that I, WILLIAM DROSS, a subject of the Emperor of Austria, residing at Newark, in the county of Essex and State of New Jersey, have invented certain new and useful Improvements in Lathes, of which the following is a specification.

The primary object of the invention is the provision of an attachment for lathes whereby rounded objects may be readily formed by operating the lathe.

A further object of the invention is the provision of a lathe attachment adapted for controlling the cutting tool in connection with the work being operated upon so that the desired concavity or arcuate cut of the tool may be readily regulated.

A still further object of the invention is to provide a tool manipulating attachment for lathes that is easy and inexpensive to manufacture and capable of rendering the cutting of curved surfaces on the part of the operator as well as insuring even and true curves in the finished work and of any dimension desired.

With these general objects in view and others that will appear as the nature of the invention is better understood, the same consists in the novel construction, combination and arrangement of parts hereinafter more fully described, illustrated in the accompany drawings, and pointed out in the appended claim.

In the drawings forming a part of this application and in which like designating characters refer to corresponding parts throughout the several views.

Figure 1:
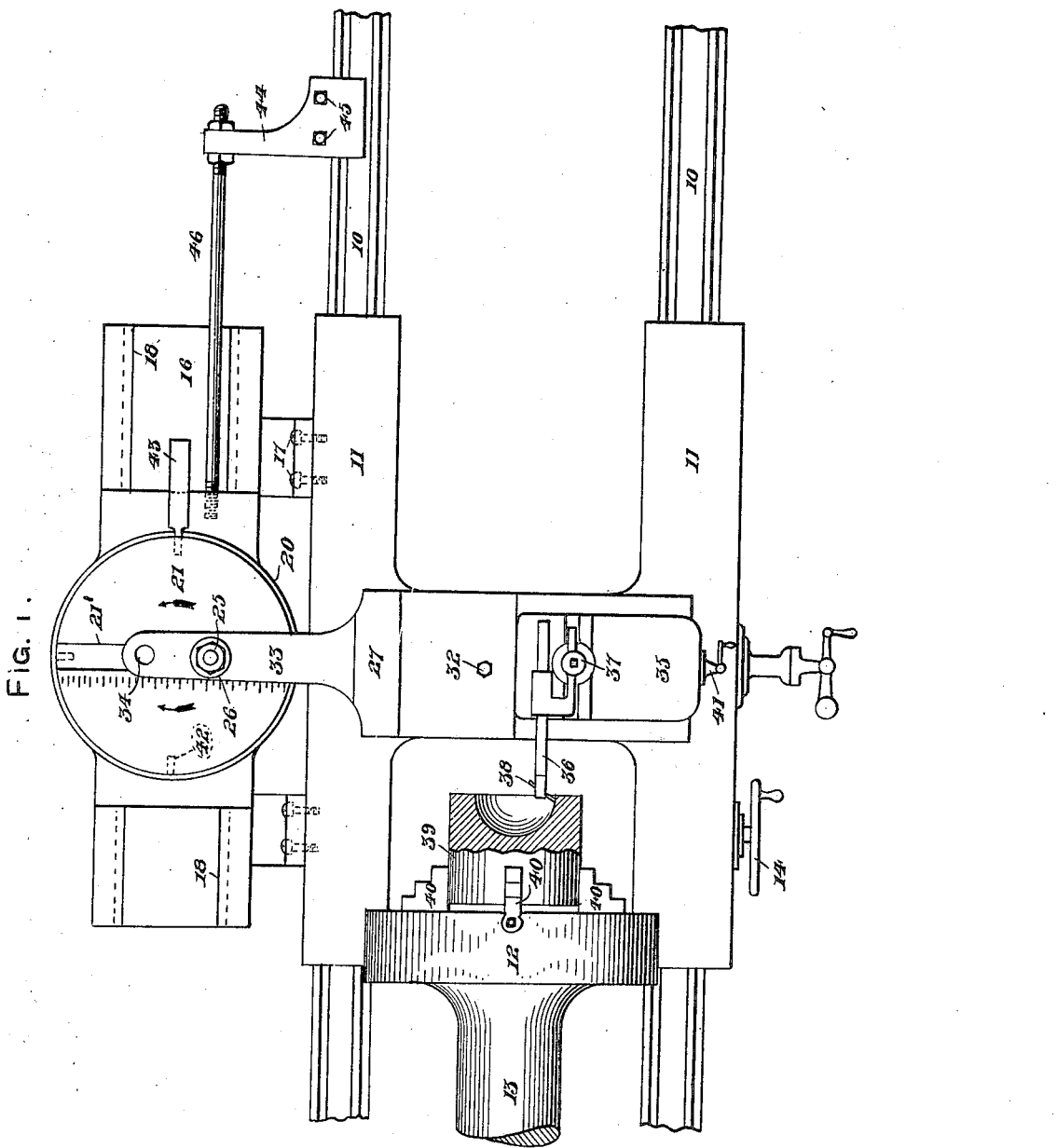
Figure 1 is a top plan view of a lathe provided with my invention.
Figure 2:
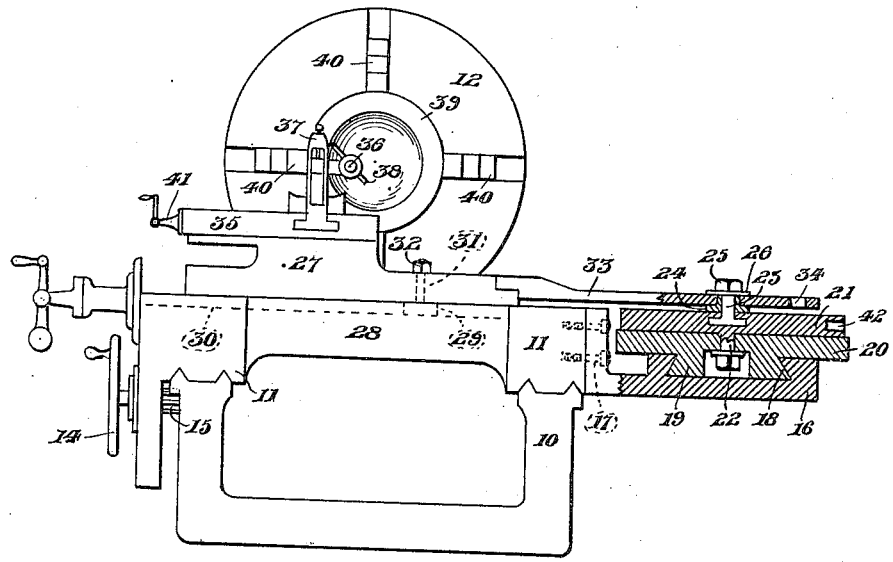
Figure 2 is an end elevation thereof.
Figure 3:
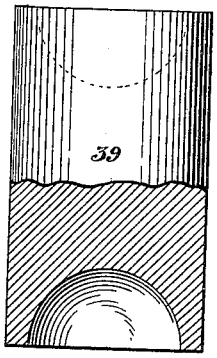
Figures 3 and 4 are views illustrating finished work formed upon a lathe by the use of my invention.
Figure 4:
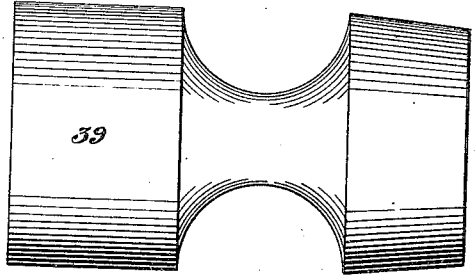

Referring more in detail to the drawings, a lathe is illustrated having the usual bed or frame 10 upon the opposite rails of which the carriage 11 is slidably mounted longitudinally of the lathe relatively of the head 12 provided with the operating spindle 13.

The carriage 11 may be longitudinally moved upon the frame 10 by means of a hand wheel 14 having operative connections 15 with the frame.

The carriage 11 is provided with a table 16 secured at one side thereof by means of screws 17 for traveling with the table, suitable ways 18 being arranged in which the depending rib 19 of a slide 20 is positioned. A disk or dial 21 is centrally pivoted to the slide 20 by means of a stub axle 22 while a post 23 is adjustably positioned within a diametrical groove 21′ in the upper face of said disk. A sleeve 24 upon said post rests upon the disk 21 and is impinged thereagainst by means of a lock nut 25 upon the upper end of the post while a washer 26 is positioned between said nut and the upper end of the sleeve 24. In this manner the post 23 may be secured at any desired radial position of the disk 21 in the slot 24 thereof. The ordinary screw operated cross slide is removed, and a shifter 27 is mounted upon the transverse connecting portion 28 of the carriage 11 in lieu thereof, such connection being by means of a block 29 longitudinally slidable within a slot 30 of the carriage portion 28, while a bolt 31 engages the block 29 with the shifter 27 journaled upon said bolt, the latter preferably having an adjusting head 32 above the adjacent portion of the shifter 27. A projecting arm 33 of the shifter 27 is journaled upon the sleeve 24 while a second opening 34 is preferably provided in the said arm adapted for regulating the sleeve 24 when desired.

A tool block 35 is suitably mounted upon the shifter 27 for holding a tool such as the cutter 36 in the tool post 37, whereby the point or edge member 38 of the tool may operate upon the work such as the block 39 held by the chuck members 40 of the head 12. Operating means 41 may be provided for the tool block while receiving sockets 42 are provided in the periphery of the disk 21 for the removable reception of a handle 43 for manually turning the said disk. A bracket 44 is adjustably secured to one side of the bed 10 by means of clamping bolts 45 having a rod 46 secured thereto and threaded into the adjacent end of the slide 20. With the provision of the rod 46, the disk and slide are held stationary when the carriage 11 is slightly shifted to accommodate the positioning of work, so that it will not be necessary to make a double adjustment of the parts when preparing the lathe for operation. Also, when it is desired to work upon an object of varying dimensions, the bracket 44 may be adjusted on the guide frame 10, to shift the slide upon the table 16.

In operation, the head 12 and work 39 being revolved in the usual manner, the cutter 38 will be brought into proper engagement with the block 39 by first adjusting the tool 36 and then turning the disk 21 by means of its handle 43 which moves the post 35 in an arcuate path of travel back and forth as indicated by the arrows in Figure 1. This movement of the disk 21 not only rocks the shifter 27 upon its pivot bolt 31 but also draws the shifter longitudinally transversely of the bed 10 upon the carriage 11. These movements of the shifter 27 bring the cutting member 38 into contact with the work 39 for performing the desired operation of making the desired cut in the adjacent face of the work during the revolution of the work 39 and the head 12. By adjusting the post 23 in the slot 21′, it will be seen that the longitudinal as well as swinging movements of the shifter 27 may be readily regulated, while the feeding of the carriage 11 including the shifter 27 and tool 36 toward or into the work 39 is accomplished by means of the wheel 14 in substantially the usual manner.

While the form of the invention herein shown and described is what is believed to be the preferred embodiment thereof, it is nevertheless to be understood that various forms, modifications and arrangements of parts may be made without departing from the spirit and scope of the invention as claimed.

What I claim as new is:—

In combination with a lathe having a carriage, a table at one side thereof, a slide carried by the table, a disk journaled upon the slide and having a diametrical slot in the upper face thereof, a shifter slidably and pivotally attached to the carriage, a tool block upon said shifter, an arm rigidly connected to said shifter and overlying said disk, means slidably disposed within the disk slot adapted to be adjustably connected to said arm at different points relatively to said disk slot to vary the swinging movement of the shifter, and a handle adjustably connected to the disk for moving the disk and arm connected thereto.

In testimony whereof I affix my signature.

WILLIAM DROSS.